(12) United States Patent
Honkanen et al.

(10) Patent No.: US 9,179,690 B2
(45) Date of Patent: Nov. 10, 2015

(54) EDIBLE PRODUCT WITH MASKED BITTER, SOUR AND/OR ASTRINGENT TASTE

(75) Inventors: Anniina Honkanen, Raisio (FI); Päivi Kuusisto, Naantali (FI); Ritva Lahtinen, Turku (FI); Leena Koponen, Turku (FI)

(73) Assignee: RAISIO NUTRITION LTD., Raisio (FI)

( * ) Notice: Subject to any disclaimer, the term of this patent is extended or adjusted under 35 U.S.C. 154(b) by 2199 days.

(21) Appl. No.: 10/553,760

(22) PCT Filed: Apr. 22, 2004

(86) PCT No.: PCT/FI2004/000250
§ 371 (c)(1),
(2), (4) Date: Aug. 21, 2006

(87) PCT Pub. No.: WO2004/093571
PCT Pub. Date: Nov. 4, 2004

(65) Prior Publication Data
US 2007/0026119 A1    Feb. 1, 2007

(30) Foreign Application Priority Data
Apr. 22, 2003 (FI) .................... 20030610

(51) Int. Cl.
| A23C 9/133 | (2006.01) |
| A23L 1/30 | (2006.01) |
| A23G 1/56 | (2006.01) |
| A23C 11/10 | (2006.01) |
| A23G 1/30 | (2006.01) |
| A23C 17/00 | (2006.01) |
| A23G 9/32 | (2006.01) |
| A23F 5/24 | (2006.01) |
| A23L 2/52 | (2006.01) |
| A23C 9/13 | (2006.01) |
| A23C 21/08 | (2006.01) |
| A23C 9/123 | (2006.01) |
| A23F 3/16 | (2006.01) |
| A23G 9/52 | (2006.01) |
| A23L 1/29 | (2006.01) |
| A23L 2/02 | (2006.01) |
| A23L 2/60 | (2006.01) |

(52) U.S. Cl.
CPC ............. *A23G 1/30* (2013.01); *A23C 9/1234* (2013.01); *A23C 9/133* (2013.01); *A23C 9/1315* (2013.01); *A23C 11/103* (2013.01); *A23C 17/00* (2013.01); *A23C 21/08* (2013.01); *A23F 3/163* (2013.01); *A23F 5/243* (2013.01); *A23G 1/56* (2013.01); *A23G 9/32* (2013.01); *A23G 9/52* (2013.01); *A23L 1/296* (2013.01); *A23L 1/3004* (2013.01); *A23L 2/02* (2013.01); *A23L 2/52* (2013.01); *A23L 2/60* (2013.01); *A23G 2200/00* (2013.01); *A23V 2002/00* (2013.01)

(58) Field of Classification Search
USPC .................. 424/439; 426/534, 548, 590, 611; 514/182
See application file for complete search history.

(56) References Cited

U.S. PATENT DOCUMENTS

| 5,156,866 A | 10/1992 | Sato et al. |
| 6,087,353 A | 7/2000 | Stewart et al. |
| 6,441,206 B1 | 8/2002 | Mikkonen et al. |
| 2002/0064548 A1 | 5/2002 | Kim et al. |

FOREIGN PATENT DOCUMENTS

| CN | 1299619 A | 6/2001 |
| DE | 100 63 288 A1 | 7/2002 |
| DE | 101 09 708 A1 | 9/2002 |
| JP | 2002/206100 A | 7/2002 |
| JP | 2002206100 A | 7/2002 |
| JP | 2003-219832 A | 8/2003 |
| SU | 635 951 A | 12/1978 |
| SU | 635951 A | 12/1978 |
| WO | WO 00/41491 A3 | 7/2000 |
| WO | WO 01/54686 A2 | 2/2001 |
| WO | 01/54686 A2 | 8/2001 |
| WO | 02/28204 A | 4/2002 |
| WO | WO 02/28204 A1 | 4/2002 |
| WO | 02/065845 A1 | 8/2002 |
| WO | WO 02/065845 A1 | 8/2002 |
| WO | 02/082929 A | 10/2002 |
| WO | WO 02/082929 A1 | 10/2002 |
| WO | WO 2004/093571 A1 | 4/2004 |

OTHER PUBLICATIONS

XP 002293294, 2003, Derwent.
Elliott, S.S., "Fructose, weight gain, and the insulin resistance syndrome [1-3]", Am J Clin Nutri 76, 911-922, 2002.

*Primary Examiner* — Rena L Dye
*Assistant Examiner* — Lela S Williams
(74) *Attorney, Agent, or Firm* — Arent Fox LLP

(57) ABSTRACT

The present invention relates to edible products with masked bitter, sour and/or astringent taste. The new products comprise a sweetening agent and from 0.2 to 25% by weight plant sterol ester, wherein the amount of sweetening agent is reduced as compared to a regular product.

31 Claims, No Drawings

EDIBLE PRODUCT WITH MASKED BITTER, SOUR AND/OR ASTRINGENT TASTE

CROSS-REFERENCE TO RELATED APPLICATION

This application is a National Stage entry of International Application No. PCT/FI2004/000250, filed Apr. 22, 2004, the entire specification claims and drawings of which are incorporated herewith by reference.

FIELD OF INVENTION

The present invention concerns edible products wherein a bitter, sour and/or astringent taste of the product is masked, and methods for masking a bitter, sour and/or astringent taste of an edible product. The edible products also have a reduced content of sweetening agents, and are healthier due to the added ingredient.

BACKGROUND OF THE INVENTION

Many food products and beverages have unpleasant, undesired taste, which is often mainly related to excess bitterness or sourness. Because the taste of the product plays an essential role when determining the final acceptance by the consumer, efforts have been made to mask or diminish the unpleasant taste. Some examples of products that have unpleasant, bitter or sour taste are e.g. beverages, such as fruit and vegetable juices, coffee, tea, cocoa and chocolate products, soy products and cereal products, especially soy and cereal based drinks, fermented products, such as yoghurts and fermented soy products. The unpleasant taste is often more pronounced in low viscosity products than in products having higher viscosity. The products mentioned above are currently consumed in increasing amounts.

Various methods have been used to mask the unpleasant taste. A commonly used method is to mask the unpleasant taste by enhancing the sweetness of the product. This is usually achieved by adding extra sugar or other sweetening agents. In most cases, this imparts additional calories into the products and truly low calorie products cannot be formulated by using this approach. Food industry has currently put a lot of emphasis on developing products with low carbohydrate content, especially with low sugar and other absorbable carbohydrate content. These so called "low carb" or lowered GI (Glycemic Index) products are marketed for e.g. weight control purposes. However, the need of masking the bitter, astringent or sour taste also in these low carb products still remains, and it has been done e.g. by using artificial sweetening agents. Although these low-calorie or non-calorie artificial sweetening agents bring only few or not at all extra calories to the product, some of them, e.g. saccharin and Acesulfame-K have bitter off-taste themselves. In addition, there are many regulatory restrictions in usage of the above mentioned sweetening agents, e.g. their use is allowed only in a limited range of products and in limited amounts. Also the safety of some of these products is still under debate, and for example consumption of aspartame should be avoided by phenylketonuric individuals. The increasing number "low carb" products on the market may lead to increased consumption of artificial sweetening agents and thus the accepted daily intake limits of these sweetening agents are exceeded more easily. Truly low carbohydrate or low sugar products with good taste characteristics and with no increased amounts of artificial sweetening agents are thus not easily formulated.

The sugar most often used to mask undesired tastes is sucrose, and reducing the amount of it is therefore the most preferred embodiment of the invention. Also fructose and fructose syrups are very common and often preferred because of their stronger relative sweetness compared to sucrose. In the past, fructose was considered to be a better choice than sucrose or glucose, especially for people having diabetes mellitus, because fructose digestion results in smaller postprandial glycemic and insulin excursions than glucose. However, more recently fructose has been found to be a contributor to many diseases, such as manifestations of the insulin resistance syndrome. Fructose consumption induces insulin resistance, impaired glucose tolerance, hyperinsulinemia, hypertension and hyperlipidemia, i.e. risk factors for cardiovascular disease. Consumption of fructose is also likely to lead to increased energy intake, weight gain and obesity. Thus added fructose is not recommended. Especially people with insulin resistance or hyperlipidemia should not choose products sweetened with fructose. (Elliot S. S. et al., Am. J. Clin. Nutr. 76 (2002) 911). Sugar alcohols have also been used as sweetening agent, but their sweetness, and ability to mask undesired tastes, is poor compared to fructose or sucrose based ingredients. In addition to sugar and other sweetening agents, also other components have been used to mask or reduce the unpleasant taste, e.g. different kind of aromas and also certain lipid compounds or compositions containing lipids. Especially triglycerides, with high content of saturated fatty acids, are known to be effective in masking undesired taste in food products. This has been applied also in the so called "low carb" products, where the reduction of sugar and other carbohydrate sweetening agents has been compensated if not with artificial sweetening agents then e.g. with higher content of triglyceride lipids compared to regular products. However, triglycerides can have a negative effect on the nutritional characteristics of the product. Lipids also impart extra calories to the product.

The effect of plant sterols on the taste characteristics of food products has most commonly been described either as adverse or having no effect. Examples of regular products (as defined later) into which plant sterols have been added are disclosed in the following patents and patent applications: U.S. Pat. No. 6,087,353, WO 02/082929, DE 101 09 708, CN 1299619, DE 100 63 288, WO 00/41491, U.S. Pat. No. 6,441,206, U.S. 2002/0064548 and WO 01/54686.

U.S. Pat. No. 6,087,353 discloses a composition that comprises one or more esterified and subsequently hydrogenated phytosterols and is suitable for incorporation into foods, beverages, pharmaceuticals and nutraceuticals. Also foods and beverages comprising the composition are disclosed.

WO 02/082929 discloses food products comprising dietary fibre and plant sterol. Food products, such as fermented yoghurt-like cereal products, fermented dairy product, fruit drink, vanilla ice cream-type food and fruit musli containing elevated levels of plant sterols and dietary fibre are disclosed.

DE 101 09 708 discloses a water-soluble active agent concentrate containing phytosterol and an emulsifier such as polysorbate and a method of producing the concentrate. Beverages containing the concentrate are also claimed.

CN 1299619 discloses a protein beverage comprising phytosterol aliphatic ester.

DE 100 63 288 discloses mixed fruit, vegetable, milk and/or wine beverage containing up to 20 gal added phytosterols. The beverages are produced by adding a solution containing phytosterols and an emulsifier to a base beverage prepared from fruit, vegetables, milk or wine.

WO 00/41491 teaches that adding plant sterols into various milk or soy milk based products resulted in products that had similar texture, appearance and flavour or were substantially indistinguishable from the corresponding product compositions without added plant sterols. Thus no changes or improvements in the taste characteristics were noted.

U.S. Pat. No. 6,441,206 discloses compositions that contain the hydroxyl acid or dicarboxylic acid or amino acid esters of a phytosterol and/or phytostanol, or the mixed esters formed with alcohols, polyols or polyol (C2-C22)-fatty acid esters of dicarboxylic acids or hydroxyl acids or the (C2-C22)-fatty acid esters of hydroxyl acids and dietary fats comprising these compositions. Adding the compounds of the invention into chocolate flavoured truffles, mayonnaise, alcoholic beverage or spread did not have adverse effect on the product's taste.

U.S. 2002/0064548 describes a method for dispersing plant sterol. The method comprises steps of melting an admixture of plant sterol and an emulsifier, mixing the molten mixture with an aqueous beverage or emulsifier-containing aqueous beverage and stirring the mixture at a high speed to give a dispersion of plant sterol in a beverage. In the beverages thus obtained plant sterols are in a form of nano-sized micelles that have no influence on the characteristic taste and flavour of the beverages.

WO 01/54686 describes how the bitter taste of L-arginine is reduced by coating arginine with phytosterols. The bitter tasting component, L-arginine, is mixed with the coating material (phytosterols) in a solvent system, such as hexane and ethanol. Then the mixture is dried, e.g. spray dried, to obtain phytosterol-coated L-arginine. The bitter, fishy unpleasant taste of L-arginine is diminished by this technique.

Although the coating technique is effective in reducing the bitter or otherwise unpleasant taste, one disadvantage is the need for extra processing, e.g. drying. This makes the process both unsuitable for certain type of products and expensive.

SU 635951 introduces a method to improve the taste of canned dietetic food products containing beta-sitosterol. Taste is improved by reducing the amount of beta-sitosterol in the product.

WO 02/065845 discloses a deodorization process and a phytosterol-containing edible fat composition produced by the deodorization process. The phytosterol-containing edible fat composition produced by this process has an improved taste although it contains a sufficient amount of a phytosterol.

It is known that increasing the viscosity of the product decreases the intensity of bitter and/or sour taste. However, many products are preferred to be consumed in a liquid or low-viscosity form. There are not good methods for producing low-viscosity, low-sugar and low-fat products where bitter and/or sour tastes are well masked.

There is a growing need for healthy products with good taste and high nutritional value.

Low-fat products with reduced unpleasant or too strong tastes, such as bitterness or sourness, without increased sugar and/or calorie and/or artificial sweetening agent content are needed. Especially products with low viscosity, such as beverages, with these characteristics would be desirable. The present invention provides products meeting these requirements.

SUMMARY OF THE INVENTION

The present invention provides edible products containing an added healthy ingredient, plant sterol ester. It is also possible to improve the nutritional properties of the products by using this invention. The invention is directed in particular to edible products containing an added healthy ingredient, plant sterol ester, and having a reduced content of sugar or other sweetening agents that are normally added for masking bitterness, sourness and/or astringent taste. The invention is also particularly directed to edible products with masked bitter, sour and/or astringent taste together with lowered content of sugar or other sweetening agents.

It was found that by introducing plant sterol ester into an edible product, the bitter, sour and/or astringent tastes that normally occur in many edible products, could be masked by means of a reduced amount of sugar or other sweetening agents as compared to corresponding regular products. Examples of this kind of products include, but are not restricted to, soy and legume based products, cereal products, especially soy and cereal based drinks, fruit and vegetable products, beverages, such as fruit and vegetable juices, coffee, tea, cocoa and chocolate products and fermented products, such as yoghurts and fermented soy products. The benefits of the present invention are especially pronounced in low viscosity products. Particular edible products according to the invention are characterised by what is stated in the independent product claims.

The present invention also provides a method for masking a bitter, sour and/or astringent taste of an edible product by incorporating plant sterol ester into the product.

A preferred embodiment of the present invention is that it provides edible products with reduced amount of added sugar or other sweetening ingredients while keeping the unpleasant bitter, sour and/or astringent taste at a low level. These products usually have lower calorie content than the regular products where the unpleasant taste has been masked with extra sugar.

It is known that plant sterol ester has serum cholesterol level lowering effects. In a preferred embodiment additional benefits of the edible product with acceptable taste include also health benefits, i.e. serum total and/or LDL cholesterol lowering effects.

DEFINITIONS

As used here, "edible product" comprises all food products, nutraceuticals and pharmaceuticals wherein the basic products contain bitter, sour and/or astringent tastes. Some of these tastes may be regarded unpleasant in certain products. The food products are a preferred embodiment of the invention.

The food products comprise e.g. soy based products, cereal or grain based products, fermented products, citrus or other fruit based products, berry products, vegetable products, coffee, tea or cocoa based products, soups, drinks, meal replacement products and/or any combination of them. Typical examples of these food products include soy or cereal based drinks, desserts, ice creams or yoghurts. Also different kind of fruit and vegetable juices, jams or thickened juices are typical examples of the food products. The invention is especially directed to all food products containing bitter, sour and/or astringent taste.

As used here the term "regular product" describes all food products, nutraceuticals and pharmaceuticals that contain bitter, sour and/or astringent tastes and where a sweetening agent has been added in conventional amounts to mask the bitter, sour and/or astringent tastes. As used here the term "sweetening agent" includes compounds used to increase the sweetness of the product. Sweetening agents include carbohydrate sweetening agents, i.e. sugars and other carbohydrate sweetening agents, and non-carbohydrate sweetening agents. As used here the term "sugar" refers to sucrose and the constituents of sucrose i.e. glucose and/or fructose, sugar syrup, malt syrup, maple syrup, starch syrup, glucose syrup, high-fructose syrups such as high-fructose corn syrup, honey, molasses, and other carbohydrates that can be used as sweetening agents or a source of these. The term "other carbohydrate sweetening agents" refers to e.g. sugar alcohols, such as xylitol, maltitol, lactitol and sorbitol. Suitable examples of the non-carbohydrate sweetening agents include e.g. aspartame, acesulfame-K, saccharin, cyclamates and sucralose.

As used here, the term "plant sterol ester" refers to plant sterols having at least 60%, preferably at least 85%, most preferably at least 95% of the plant sterols in esterified form.

In this invention the plant sterols are esterified with an organic acid and it is here called "plant sterol ester". Examples of suitable organic acids are fatty acids (2-24 carbon atoms, saturated, monounsaturated or polyunsaturated, including also special fatty acids, such as conjugated fatty acids, e.g. CLA, and EPA and DHA), hydroxybenzoic acids, hydroxycinnamic acids (ferrulic and coumaric acids), di- and tricarboxylic acids and hydroxy acids, and any mixture of said acids. Preferably the plant sterols are esterified with C4-C22 fatty acids, most preferably with vegetable oil based fatty acids.

As used here, the term "plant sterol" includes both sterols and saturated sterols, i.e. stanols. In this specification the sterols include 4-desmethyl sterols, 4-monomethyl sterols and 4,4-dimethyl sterols (triterpene alcohols) and the stanols include 4-desmethyl stanols, 4-monomethyl stanols and 4,4-dimethyl stanols. Typical 4-desmethyl sterols are sitosterol, campesterol, stigmasterol, brassicasterol, 22-dehydrobrassicasterol and $\Delta 5$-avenasterol. Typical 4,4-dimethyl sterols are cycloartenol, 24-methylenecycloartenol and cyclobranol. Typical stanols are sitostanol, campestanol and their 24-epimers, cycloartanol and saturated forms obtained by saturation of e.g. triterpene alcohols (cycloartenol, 24-methylenecycloartenol and cyclobranol). The term "plant sterol" includes all possible mixtures of named sterols and/or stanols as well as any individual sterol or stanol.

Stanol fatty acid ester and the effects thereof, as well as a suitable method for its preparation, are disclosed in U.S. Pat. No. 6,174,560.

DETAILED DESCRIPTION OF THE INVENTION

The various features and benefits of the present invention will be described in greater detail in the following and in the examples. All percentages referred to in this specification are given as % by weight.

It has now surprisingly been noticed that by adding plant sterol ester to an edible product containing a sweetening agent, the amount of the sweetening agent can be reduced while keeping the bitter, sour and/or astringent taste masked. This means that the sweetening agent content of the final product can be reduced since plant sterol ester masks the bitter, sour and/or astringent tastes of the product and high amount of sweetening agent is not needed to improve the acceptance.

The primary object of the present invention is thus to provide certain edible products with masked bitter, sour and/or astringent taste.

Thus, the present invention provides an edible product comprising a sweetening agent for masking a bitter, sour and/or astringent taste of the edible product, said product additionally comprising from 0.2 to 25% by weight plant sterol ester for replacing part of the taste masking sweetening agent.

The present invention also provides an edible product comprising a sweetening agent and from 0.2 to 25% by weight plant sterol ester, wherein the amount of sweetening agent is reduced as compared to a regular product.

Preferably the plant sterol ester is a plant sterol fatty acid ester. The fatty acid ester is technically very suitable for incorporation into different food products. Preferably the plant sterol in the plant sterol ester is a stanol because its absorption is negligible and the use of stanol is therefore safer. In addition, the physical properties of stanol are more suitable for this purpose, because the stanol is saturated. Most preferred is therefore the plant stanol fatty acid ester for use in food products according to the invention.

The level of plant sterol ester in the edible product is from 0.2 to 25% by weight, preferably 0.5-15 weight-% and more preferably 1.0-10% by weight.

The level of the sweetening agent in the edible product is from 0.00005 to 30% by weight, preferably from 0.0003 to 20% by weight, more preferably from 0.002 to 10% by weight and most preferably from 0.01 to 7% by weight.

The sweetening agent can be a carbohydrate sweetening agent or a mixture of carbohydrate sweetening agents or a non-carbohydrate sweetening agent or a mixture of non-carbohydrate sweetening agents or a mixture of carbohydrate and non-carbohydrate sweetening agents.

The amount of the carbohydrate sweetening agent in the product can be from 0.1 to 30% by weight, preferably from 0.5 to 20% by weight, more preferably from 1 to 10% by weight and most preferably from 2 to 7% by weight. The amount of the non-carbohydrate sweetening agent in the product can be from 0.00005 to 0.08% by weight, preferably from 0.0003 to 0.05% by weight, more preferably from 0.002 to 0.02% by weight and most preferably from 0.01 to 0.02% by weight.

According to this invention the amount of the sweetening agent in the edible product can be reduced by 5% to 99%, preferably by 10% to 75%, more preferably by 10% to 50% and most preferably by 15% to 30% compared to a regular product.

A preferred embodiment of this invention is improving the taste in low-viscosity edible products. The viscosity (Brookfield viscometer, share rate 21 per second measured at the temperature of conventional use of the product in question) of the edible product according to this invention is preferably 0.001 Pas to 2.0 Pas, more preferably 0.002 Pas to 1.5 Pas, still more preferably 0.002 Pas to 1.0 Pas, even more preferably 0.002 to 0.5 Pas and most preferably 0.004 Pas to 0.5 Pas.

By the use of the added ingredient, plant sterol ester, it is possible to improve the nutritional properties of the edible product. Preferably the plant sterols are esterified with fatty acids, most preferably fatty acids derived from vegetable oils with high content of monounsaturated or polyunsaturated fatty acids. Thus it is also possible to improve the fatty acid profile of the edible product compared to the regular products. A preferred embodiment of the invention is that when a part of triglyceride fat is replaced with plant sterol ester, it is possible to improve or retain the fatty acid composition of the edible product. This means that the amount of saturated fat does not necessarily increase due to the added ingredient.

In addition, it is possible to reduce the amount of absorbable fat in the final edible product if sterol ester replace triglyceride fat in the product. Moreover it is possible to achieve lower absorbable fat content as compared to the similar product where any of the triglyceride fat is not replaced with plant sterol ester. The reason for this is that the sterol part of the plant sterol fatty acid ester is virtually unabsorbable and does no increase the energy or absorbable fat content of the edible product. This is particularly useful in so called "low carb" products that often contain more absorbable fat than the comparable products having higher amount of sweetening agents and other carbohydrates. Healthier "low carb" products, with reduced amount of both sweetening agents and absorbable fat can thus be formulated by using the plant sterol ester according to this invention.

A preferred embodiment of the invention is that the products according to the invention are also healthier since they are suitable for reducing serum total and/or LDL cholesterol levels.

A preferred embodiment of the invention is that by using plant sterol ester in the product, it is possible to achieve lower energy content because the amount of fat and/or sweetening agent can be reduced without increasing the strength of bitter, sour and/or astringent tastes and without reducing the sensed sweetness of the product.

A preferred embodiment of the invention is that better texture and mouthfeel characteristics can be obtained in many applications by using the method of the present invention compared to adding sugar or other sweetening agents.

A preferred embodiment of the invention is masking the bitter taste of certain food products. Preferably the food products according the invention include soy based products, cereal or grain based products, fermented products, citrus or other fruit based products, berry products, vegetable products, coffee, tea or cocoa based products, soups, drinks and meal replacement products and any combination or source of them. Typical examples of these food products include coffee, cocoa, tea and soy and cereal based drinks. Also different kinds of fruit and vegetable juices, nectars, jams and thickened juices are typical examples of the food products.

A preferred embodiment of the invention is masking the sour taste of certain food products. Preferably the food products according the invention include soy based products, cereal or grain based products, fermented products, citrus or other fruit based products, berry products, vegetable products, soups, drinks and meal replacement products and any combination or source of them. Typical examples of these food products include soy or cereal based drinks, desserts, ice creams and yoghurts. Also different kinds of fruit and vegetable juices, nectars, jams and thickened juices are typical examples of the food products.

A preferred embodiment of the invention is masking the bitter, sour and/or astringent taste of certain nutraceuticals and/or pharmaceuticals. Preferably the nutraceuticals and/or pharmaceuticals include drinkable and low-viscosity products. A typical example of a pharmaceutical according to the invention is a liquid cough mixture, and an example on a nutraceutical is a liquid plant extract.

In the preferred embodiments of the invention the amount of the sweetening agent is reduced as compared to a regular product.

Therefore, another preferred embodiment of the invention is a cereal milk based drink comprising 0.2-10% by weight, preferably 0.5-5.0% by weight plant sterol ester and 0.5-8.0% by weight, preferably 0.6-5.0% by weight sugar and/or other carbohydrate sweetening agent.

Another preferred embodiment of the invention is a cereal milk based drink comprising 0.2-10% by weight, preferably 0.5-5.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a milk based cocoa drink comprising 0.2-10% by weight, preferably 0.5-5.0% by weight plant sterol ester and 0.2-8.0% by weight, preferably 0.2-5.0% by weight sugar and/or other carbohydrate sweetening agent.

Another preferred embodiment of the invention is a milk based cocoa drink comprising 0.2-10% by weight, preferably 0.5-5.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a milk based coffee drink comprising 0.2-7.0% by weight, preferably 0.2-5.0% by weight, more preferably 0.5-2.0% by weight plant sterol ester and 0.1-6.5% by weight, preferably 0.5-5.5% by weight sugar and/or other carbohydrate sweetening agent.

Another preferred embodiment of the invention is a milk based coffee drink comprising 0.2-7.0% by weight, preferably 0.2-5.0% by weight, more preferably 0.5-2.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a soy milk based drink comprising 0.2-10% by weight, preferably 0.5-5.0% by weight plant sterol ester and 0.1-2.3% by weight, preferably 0.2-2.0% by weight, more preferably 0.3-1.2% by weight sugar and/or other carbohydrate sweetening agent.

Another preferred embodiment of the invention is a soy milk based drink comprising 0.2-10% by weight, preferably 0.5-5.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a soy based fruit and/or flavoured drink comprising 0.2-10% by weight, preferably 0.5-5.0% by weight plant sterol ester and 0.1-9.0% by weight, preferably 0.2-7.0% by weight, more preferably 0.5-5.0% by weight sugar and/or other carbohydrate sweetening agent.

Another Preferred embodiment of the invention is a soy based fruit and/or flavoured drink comprising 0.2-10% by weight, preferably 0.5-5.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a soy based coffee or cocoa drink comprising 0.2-10% by weight, preferably 0.5-5.0% by weight, more preferably 0.5-2.5% by weight plant sterol ester and 0.1-5.5% by weight, preferably 0.5-4.5% by weight sugar and/or other carbohydrate sweetening agent.

Another preferred embodiment of the invention is a soy based coffee or cocoa drink comprising 0.2-10% by weight, preferably 0.5-5.0% by weight, more preferably 0.5-2.5% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a whey based drink comprising 0.2-7.0% by weight, preferably 0.2-5.0% by weight, more preferably 0.5-3.0% by weight plant sterol ester and 0.5-7.0% by weight, preferably 1.0-6.0% by weight sugar and/or other carbohydrate sweetening agent.

Another preferred embodiment of the invention is a whey based drink comprising 0.2-7.0% by weight, preferably 0.2-5.0% by weight, more preferably 0.5-3.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a berry based drink comprising 0.2-5.0% by weight, preferably 0.3-4.0% by weight plant sterol ester and 0.5-19% by weight, preferably 1.0-10% by weight sugar and/or other carbohydrate sweetening agent.

Another preferred embodiment of the invention is a berry based drink comprising 0.2-5.0% by weight, preferably 0.3-4.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a fruit juice based drink comprising 0.2-5.0% by weight, preferably 0.3-4.0% by weight plant sterol ester and 0.1-7.5% by weight, preferably 0.3-7.5% by weight more, preferably 0.3-5.0% by weight, and most preferably 0.3-4.0% by weight sucrose.

Another preferred embodiment of the invention is a fruit juice based drink comprising at least 50% by weight, preferably at least 75% by weight, more preferably 100% citrus fruit juice calculated on the amount of total fruit juice in the product, 0.2-5.0% by weight, preferably 0.3-4.0% by weight plant sterol ester and 0.2-7.5% by weight, preferably 0.3-5.0% by weight, more preferably 0.5-4.0% by weight sugar and/or other carbohydrate sweetening agent.

Another preferred embodiment of the invention is a fruit juice based drink comprising 0.2-5.0% by weight, preferably 0.3-4.0% by weight plant sterol ester and 0.00005-0.05% by weight, preferably 0.00005-0.03% by weight, more preferably 0.0001-0.02% by weight non-carbohydrate sweetening agent.

Another preferred embodiment of the invention is a fermented milk product, such as yoghurt or yoghurt drink, comprising 0.2-8.0% by weight, preferably 0.3-6.0% by weight plant sterol ester and 0.5-6.0% by weight, preferably 0.5-5.0% by weight, most preferably 0.5-4.0% by weight sugar and/or other carbohydrate sweetening agent.

Another preferred embodiment of the invention is a fermented milk product, such as yoghurt or yoghurt drink, comprising 0.2-8.0% by weight, preferably 0.3-6.0% by weight plant sterol ester and 0.00005-0.08% by weight, preferably 0.0003-0.05% by weight, more preferably 0.002-0.02% by weight non-carbohydrate sweetening agent.

Another preferred embodiment of the invention is a cereal-based yoghurt-like product comprising 0.2-12% by weight, preferably 0.5-7.0% by weight plant sterol ester and 0.5-9.5% by weight, preferably 1.0-8.0% by weight sugar and/or other carbohydrate sweetening agent.

Another preferred embodiment of the invention is a cereal based yoghurt-like product comprising 0.2-12% by weight, preferably 0.5-7.0% by weight plant sterol ester and 0.00005-0.08% by weight, preferably 0.0003-0.05% by weight, more preferably 0.002-0.02% by weight non-carbohydrate sweetening agent.

Another preferred embodiment of the invention is a soy based yoghurt-like product comprising 0.2-12% by weight, preferably 0.5-7.0% by weight plant sterol ester and 0.5-9.0% by weight, preferably 1.0-8.0% by weight sugar and/or other carbohydrate sweetening agent.

Another preferred embodiment of the invention is a soy based yoghurt-like product comprising 0.2-12% by weight, preferably 0.5-7.0% by weight plant sterol ester and 0.00005-0.08% by weight, preferably 0.0003-0.05% by weight, more preferably 0.002-0.02% by weight non-carbohydrate sweetening agent.

Another preferred embodiment of the invention is an ice cream-like product comprising 0.2-18% by weight, preferably 0.5-12% by weight plant sterol ester and 0.5-7.0% by weight, preferably 0.5-6.0% by weight, more preferably 0.8-5.0% by weight sugar and/or other carbohydrate sweetening agent.

Another preferred embodiment of the invention is an ice cream-like product comprising 0.2-18% by weight, preferably 0.5-12% by weight plant sterol ester and 0.00005-0.08% by weight, preferably 0.0003-0.05% by weight, more preferably 0.002-0.02% by weight non-carbohydrate sweetening agent.

Another preferred embodiment of the invention is a liquid meal replacement product comprising 0.2-10% by weight, preferably 0.5-5.0% by weight plant sterol ester and 0.5-6.5% by weight, preferably 0.5-6.0% by weight, more preferably 0.8-5.0% by weight sugar and/or other carbohydrate sweetening agent.

Another preferred embodiment of the invention is a liquid meal replacement product comprising 0.2-10% by weight, preferably 0.5-5.0% by weight plant sterol ester and 0.00005-0.05% by weight, preferably 0.0003-0.04% by weight, more preferably 0.002-0.02% by weight non-carbohydrate sweetening agent.

Another preferred embodiment of the invention is a tea based drink comprising 0.2-5.0% by weight, preferably 0.3-4.0% by weight plant sterol ester and 0.5-17% by weight, preferably 1.3-12% by weight, most preferably 2.0-8.0% by weight sugar and/or other carbohydrate sweetening agent.

Another preferred embodiment of the invention is a tea based drink comprising 0.2-5% by weight, preferably 0.3-4.0% by weight plant sterol ester and 0.00005-0.05% by weight, preferably 0.0003-0.04% by weight, more preferably 0.002-0.02% by weight non-carbohydrate sweetening agent.

Still another object of the invention is to provide a method for masking a bitter, sour and/or astringent taste of an edible product, said process comprising incorporating into the edible product having a bitter, sour and/or astringent taste a sweetening agent in an amount less than the one present in a regular product, and plant sterol ester in an amount from 0.2 to 25% by weight. The plant sterol ester is incorporated into the edible product in any convenient way without separately preparing a coating on the bitter, sour and/or astringent components of the product. The plant sterol ester is incorporated into the edible product as a part of the conventional processes used for producing the edible products, preferably is added by using any known techniques for adding triglycerides into the edible products. Neither does the method include using solvents or additional drying steps because of the added plant sterol ester.

Still another object of the invention is to provide a method for preparing an edible product with low carbohydrate content, said method comprising adding to the edible product plant sterol ester in an amount from 0.2 to 25% by weight and a carbohydrate sweetening agent in an amount less than the one present in a regular product. The plant sterol ester is added to the edible product in any known way and the content of sugar and/or other carbohydrate sweetening agent(s) in the edible product is reduced compared to a regular product.

A further aspect of the invention is the use of a plant sterol ester in an edible product in an amount from 0.2 to 25% by weight for replacing part of a sweetening agent used in the edible product for masking a bitter, sour and/or astringent taste of the product.

The edible product of the present invention may also comprise optional ingredients such as stabilizers, emulsifiers, colouring agents and nutrients (e.g. vitamins and/or minerals).

The following examples are presented only to further illustrate the invention and are not intended to limit the scope of the invention, which is defined by the claims.

EXAMPLE 1

Sensory Evaluation

It is well known that some triglycerides are added to certain food products to improve the taste. However, increased amount of absorbable fat, especially saturated fatty acids is an unwanted property when nutritional point of view is considered.

The aim of the sensory evaluation test was to compare the efficiency of plant sterol ester and vegetable oil in masking the intensity of bitter taste. The test was done by using a trained taste panel that has a long experience in sensory evaluation of food products. As plant sterol ester, plant stanol fatty acid ester and as the vegetable oil, rapeseed oil were used.

The effects were studied by using following matrixes:

| | |
|---|---|
| Matrix I | Rapeseed oil (8%) |
| | Guar gum (0.7%) |
| Matrix II | Stanol fatty acid ester (8%) |
| | Guar gum (0.7%) |

Samples were made from above mentioned matrixes with the following different amounts of caffeine: 0.02%; 0.04%; 0.06%. Reference sample contained 0% of caffeine. Water was added up to 100% and the components were mixed at 60° C. and homogenised.

Sensory evaluation was performed as a multiple comparing test. In this test the subject compared actual samples to the reference sample which did not contain any caffeine. The temperature of the samples was 50° C. when they were evaluated. 15 subjects evaluated the intensity of bitter taste as compared to the reference sample. The scale used in this study was from 0 to 3 (0=no difference, 1=weak difference, 2=clear difference, 3=strong difference). The results are given as mean values in table 1.

TABLE 1

| Taste/Matrix | Caffeine concentration | | |
|---|---|---|---|
| | 0.02% | 0.04% | 0.06% |
| Intensity of bitter taste for Matrix I | 1.5 | 1.9 | 2.6 |
| Intensity of bitter taste for Matrix II | 1.2 | 1.4 | 2.3 |

The results show that plant stanol fatty acid ester decreased the bitter taste of the product as compared to the control sample containing the same amount of rapeseed oil.

In this sensory evaluation it was surprisingly noticed that plant stanol ester was more effective in masking the bitter taste than vegetable oil.

EXAMPLE 2

Sensory Evaluation

It is well known that sugar is added to certain food products to mask bitter tastes. However, increased amount of sugar is an unwanted property when nutritional point of view is considered.

The aim of the sensory evaluation test was to study the efficiency of plant sterol ester in masking the intensity of bitter taste as compared to the effect that can be achieved with sugar. The test was done by using a trained taste panel that has a long experience in sensory evaluation of food products.

The effects were studied by using the following samples:

| | |
|---|---|
| Sample I | Soy milk (92.1%) |
| | Sucrose (7.8%) |
| | Caffeine (0.06%) |
| Sample II | Soy milk (89.3%) |
| | Sucrose (6.6%) |
| | Stanol fatty acid ester (4.0%) |
| | Caffeine (0.06%) |
| Sample III | Soy milk (90.4%) |
| | Sucrose (5.5%) |
| | Stanol fatty acid ester (4.0%) |
| | Caffeine (0.06%) |

The samples were made with suitable equipment by using heating and homogenisation. Sensory evaluation was performed as a two-tailed paired test. In this test the subjects compared samples II and III to the reference sample (I). 14 subjects evaluated the intensity of bitter taste as compared to the reference sample and answered to the following questions:

a) Which one of the samples, I or II, is more bitter?
b) Which one of the samples, I or III, is more bitter?

The subjects did not detect any difference between the bitter taste of sample I and sample II; neither between sample I and sample III.

In this sensory evaluation we showed that it is possible to reduce the amount of sucrose up to 30% when plant stanol ester is added into the product. The sensory evaluation group was not able to detect the difference between the products where bitter taste was masked with sucrose or where it was masked with plant stanol ester.

EXAMPLE 3

Sensory Evaluation

It is well known that sugar is added to certain food products to mask sour tastes. However, an increased amount of sugar is an unwanted property when considering nutritional values.

The aim of the sensory evaluation test was to study the efficiency of plant sterol ester in masking the intensity of sour taste as compared to the effect that can be achieved with sugar. The test was done by using a trained taste panel that has a long experience in sensory evaluation of food products.

The effects were studied by using following matrixes:

| | |
|---|---|
| Sample I | Water (90.2%) |
| | Pectin (1.5%) |
| | Sucrose (8.0%) |
| | Citric acid (0.3%) |
| Sample II | Water (87.6%) |
| | Pectin (1.5%) |
| | Sucrose (6.6%) |
| | Stanol fatty acid ester (4.0%) |
| | Citric acid (0.3%) |
| Sample III | Water (88.6%) |
| | Pectin (1.5%) |
| | Sucrose (5.6%) |
| | Stanol fatty acid ester (4.0%) |
| | Citric acid (0.3%) |

The samples were made with suitable equipment by using heating and homogenisation. Sensory evaluation was performed as a two-tailed paired test. In this test the subjects compared samples II and III to the reference sample I. 15 subjects evaluated the intensity of sour taste as compared to the reference sample and answered to the following questions:

a) Which one of the samples, I or II, is more sour?
b) Which one of the samples, I or III, is more sour?

The subjects did not detect any difference between the sour taste of sample I and II; neither between sample I and III.

In this sensory evaluation we showed that it is possible to reduce the amount of sucrose up to 30% when plant stanol ester is added into the product. The sensory evaluation group was not able to detect the difference between the products where sour taste was masked with sucrose or where it was masked with plant stanol ester.

Examples 4-22 illustrate food products where the amount of sweetening agent(s) could be reduced due to an added ingredient according to the present invention.

EXAMPLE 4

Soy Milk Drink

| | |
|---|---|
| Fat free soy milk | 93.3% |
| Plant stanol fatty acid ester | 5.0% |
| Sucrose | 1.7% |

The soy milk drink contained 30% less sucrose than a regular product.

EXAMPLE 5

Soy Based Fruit Drink

| | |
|---|---|
| Water | 82.1% |
| Plant stanol fatty acid ester | 3.0% |
| Concentrated fruit juice, unsweetened | 6.0% |
| High fructose corn syrup | 7.0% |
| Soy protein isolate | 1.8% |
| Emulsifiers | 0.1% |

The flavoured soy based drink contained 26% less sweetening agent than a regular product.

EXAMPLE 6

Soy Based Coffee Drink

| | |
|---|---|
| Fat free soy milk | 90.5% |
| Sucrose | 5.0% |
| Instant coffee | 2.0% |
| Plant stanol fatty acid ester | 2.5% |

The soy milk coffee contained 16% less sucrose than a regular product and the bitter and astringent taste was masked as well as in a regular product, although the amount of sucrose was reduced.

EXAMPLE 7

Cocoa Drink

| | |
|---|---|
| Milk | 91.9% |
| Sucrose | 2.5% |
| Plant sterol fatty acid ester | 3.0% |
| Cocoa | 2.5% |
| Emulsifiers | 0.1% |

The cocoa drink contained 50-75% less sucrose than a regular product. The ratio of sucrose and cocoa in a regular cocoa drink is from about 2:1 to about 4:1. In the cocoa drink containing plant stanol fatty acid ester the sucrose:cocoa ratio was 1:1 and the amount of sucrose could be decreased by 50% compared to the regular products having the lowest sugar content without compromising the taste.

EXAMPLE 8

Grapefruit Juice

| | |
|---|---|
| Grapefruit juice | 98.3% |
| Plant stanol fatty acid ester | 1.0% |
| Pectin | 0.7% |
| Aspartame | 0.02% |

The grapefruit juice contained 37% less aspartame than a regular grapefruit juice sweetened with aspartame.

EXAMPLE 9

Cranberry Juice

| | |
|---|---|
| Cranberry juice | 82.5% |
| Sucrose | 15.0% |
| Plant stanol fatty acid ester | 1.8% |
| Pectin | 0.7% |

The cranberry juice contained 25% less sucrose than a regular cranberry juice and the sour taste was masked as well as in a regular product, although the amount of sucrose was reduced.

EXAMPLE 10

Orange Juice

| | |
|---|---|
| Orange juice | 96.0% |
| Plant stanol fatty acid ester | 1.8% |
| Emulsifier | 0.1% |
| Stabilizer | 0.1% |
| Sucrose | 2.0% |

The orange juice contained 50% less sucrose than a regular orange juice sweetened with sucrose.

EXAMPLE 11

Yoghurt Drink

| | |
|---|---|
| Pasteurized milk | 86.8% |
| Sucrose | 6.0% |
| Plant stanol fatty acid ester | 1.0% |
| Fruit/berry juice concentrate (unsweetened) | 6.0% |
| Stabilizers | 0.2% |
| Sodium citrate | |

The yoghurt drink was prepared by conventional yoghurt drink preparation methods and fermented with *Bifidobacteria* culture. The amount of sweetening agent (sucrose) was reduced by 20% in the yoghurt drink containing plant stanol fatty acid ester compared to a regular product sweetened with sucrose.

EXAMPLE 12

Yoghurt-like Product

| | |
|---|---|
| Soy milk | 75.5% |
| Strawberry jam | 20.0% (containing 35% sucrose) |
| Plant sterol fatty acid ester | 4.0% |
| Pectin | 0.5% |

The yoghurt was prepared by conventional soy yoghurt preparation methods and fermented with *Bifidobacteria* culture. The strawberry jam, and thus the yoghurt produced by using it, contained 26% less sucrose than a regular product. The bitter taste of the product was masked as well as in a regular product, although the amount of sucrose was reduced.

EXAMPLE 13

Yoghurt-like Product

| | |
|---|---|
| Oat milk | 74.0% |
| Strawberry jam | 20.0% (containing 37% sucrose) |
| Plant stanol fatty acid ester | 3.0% |
| Oat bran | 2.5% |
| Pectin | 0.5% |

The yoghurt was prepared by conventional yoghurt preparation methods and fermented with *Bifidobacteria* culture. The strawberry jam, and thus the oat milk yoghurt produced by using it, contained 26% less sucrose than a regular product.

EXAMPLE 14

Ice Cream-like Product

| | |
|---|---|
| Soy bean water extract | 81.3% |
| Sucrose | 6.0% |
| Plant stanol fatty acid ester | 12.0% |
| Vanilla flavor | 0.2% |
| Stabilizers (carrageenan, guar gum, xanthan gum) | 0.5% |

The ice cream-like product contained 25% less sucrose than a regular product.

EXAMPLE 15

Liquid Meal Replacement Product

Liquid meal replacement in a form of a ready to drink shake was prepared of the following ingredients: soy milk, fruit juice (orange, banana, strawberry), plant sterol fatty acid ester (4%), sucrose (5%), vitamins and minerals. The amount of sucrose was 28% lower than in a regular meal replacement product due to the added ingredient according to the present invention. The bitter and astringent taste of the product was masked as well as in a regular product, although the amount of sucrose was reduced.

EXAMPLE 16

Liquid Meal Replacement Cocoa Drink

| | |
|---|---|
| Water | 83.5% |
| Cocoa | 2.0% |
| Soy protein | 6.0% |
| Plant stanol fatty acid ester | 2.5% |
| Guar Gum | 2.0% |
| Sucrose | 4.0% |

The liquid meal replacement cocoa drink contained 50% less sucrose than a regular product.

EXAMPLE 17

Whey Based Drink

| | |
|---|---|
| Whey | 84.7% |
| Sugar syrup | 6.0% |
| Plant sterol fatty acid ester | 1.2% |
| Fruit/berry juice concentrate (unsweetened) | 8% |
| Carrageenan | 0.1% |
| Sodium citrate | |

The amount of sucrose was reduced by 20% in the whey based drink containing plant sterol fatty acid ester compared to a regular product.

EXAMPLE 18

Yoghurt

| | |
|---|---|
| Pasteurized milk | 85.2% |
| Sucrose | 5.5% |
| Plant stanol fatty acid ester | 1.0% |
| Strawberry preparation (unsweetened) | 8% |
| Stabilizers | 0.2% |
| Sodium citrate | |
| Color (anthocyanins) | |

The yoghurt was prepared by conventional yoghurt preparation methods and fermented with *Bifidobacteria* culture. The amount of sucrose was reduced by 15% in the yoghurt containing plant stanol fatty acid ester compared to a regular product sweetened with sucrose. The sour taste of the product was masked as well as in a regular product, although the amount of sucrose was reduced.

EXAMPLE 19

Milk Based Coffee Drink

| | |
|---|---|
| Milk (1.5% fat) | 89.1% |
| Sucrose | 6.0% |
| Instant coffee | 3.0% |
| Plant stanol fatty acid ester | 1.8% |
| Emulsifier | 0.1% |
| Tricalcium citrate | 0.015% |

The milk coffee contained 12% less sucrose than a regular product and had the bitter taste masked as well as in a regular product, although the amount of sucrose was reduced.

EXAMPLE 20

Tea Drink

| | |
|---|---|
| Tea based drink | 88.8% |
| Plant stanol fatty acid ester | 1.0% |
| Emulsifier | 0.1% |
| Stabilizer | 0.1% |
| Sucrose | 10.0% |

The tea drink contained 44% less sucrose than a regular tea based drink sweetened with sucrose.

EXAMPLE 21

Yoghurt Sweetened with a Non-carbohydrate Sweetening Agent

| | |
|---|---|
| Pasteurized skimmed milk | 82.8% |
| Plant stanol fatty acid ester | 2.0% |
| Strawberry preparation (unsweetened) | 15% |
| Stabilizers | 0.2% |
| Aspartame | 0.02% |
| Sodium citrate | |
| Color (anthocyanins) | |

The yoghurt was prepared by conventional yoghurt preparation methods and fermented with *Lactobacillus acidophilus, Lactobacillus bulgaricus* and *Streptococcus themophilus* culture. The amount of aspartame was reduced by 60% in the yoghurt containing plant stanol fatty acid ester compared to a regular product sweetened with aspartame. The sour taste was masked as well as in a regular product sweetened with aspartame, although the amount of aspartame was reduced.

EXAMPLE 22

Liquid meal replacement product for people following a "low carb" diet

Liquid meal replacement in a form of a ready to drink shake was prepared of the following ingredients: skimmed lactose free milk, milk caseinate (2%, containing max 0.2% lactose), cocoa powder (3%), plant sterol fatty acid ester (2%), sucrose (1%), guar gum (0.5%), vitamins and minerals. The sucrose content was reduced by 90% compared to a regular meal replacement product due to the added ingredient according to the present invention.

The invention claimed is:

1. A method for preparing an edible product comprising a sweetening agent for masking a bitter, sour and/or astringent taste of the edible product, the method comprising:
providing an amount of sweetening agent that is insufficient to entirely mask the bitter, sour and/or astringent taste of the edible product; and
adding a plant sterol ester in an amount that, in combination with the sweetening agent, is effective to mask the bitter, sour, and/or astringent taste of the edible product, wherein the amount of plant sterol ester added is from 0.2 to 25% by weight.

2. The method of claim 1, wherein the amount of plant sterol ester added in the product is from 0.5 to 15% by weight.

3. The method of claim 1, wherein the sweetening agent provided comprises a carbohydrate sweetening agent or a non-carbohydrate sweetening agent or a mixture thereof.

4. The method of claim 3, wherein the amount of carbohydrate sweetening agent in the product is from 0.1 to 30% by weight, and wherein the amount of non-carbohydrate sweetening agent in the product is from 0.00005 to 0.08% by weight.

5. The method of claim 1, wherein the plant sterol ester is sterol fatty acid ester.

6. The method of claim 1, wherein the plant sterol ester is plant stanol fatty acid ester.

7. The method of claim 1, wherein the viscosity of the product is 0.001 to 2.0 Pas.

8. A method for preparing a cereal milk based drink comprising a carbohydrate sweetening agent for masking a bitter, sour and/or astringent taste of the cereal milk based drink, the method comprising:
providing an amount of carbohydrate sweetening agent that is insufficient to entirely mask the bitter, sour and/or astringent taste of the cereal milk based drink; and
adding a plant sterol ester in an amount that, in combination with the carbohydrate sweetening agent, is effective to mask the bitter, sour, and/or astringent taste of the cereal milk based drink,
wherein the amount of carbohydrate sweetening agent provided is 0.5-8.0% by weight, and
wherein the amount of plant sterol ester added is 0.2-10% by weight.

9. A method for preparing a milk based cocoa drink comprising a carbohydrate sweetening agent for masking a bitter, sour and/or astringent taste of the milk based cocoa drink, the method comprising:
providing an amount of carbohydrate sweetening agent that is insufficient to entirely mask the bitter, sour and/or astringent taste of the milk based cocoa drink; and
adding a plant sterol ester in an amount that, in combination with the carbohydrate sweetening agent, is effective to mask the bitter, sour, and/or astringent taste of the milk based cocoa drink,
wherein the amount of carbohydrate sweetening agent provided is 0.2-8.0% by weight, and
wherein the amount of plant sterol ester added is 0.2-10% by weight.

10. A method for preparing a milk based coffee drink comprising a carbohydrate sweetening agent for masking a bitter, sour and/or astringent taste of the milk based coffee drink, the method comprising:
providing an amount of carbohydrate sweetening agent that is insufficient to entirely mask the bitter, sour and/or astringent taste of the milk based coffee drink; and
adding a plant sterol ester in an amount that, in combination with the carbohydrate sweetening agent, is effective to mask the bitter, sour, and/or astringent taste of the milk based coffee drink,
wherein the amount of carbohydrate sweetening agent provided is 0.1-6.5% by weight, and
wherein the amount of plant sterol ester added is 0.2-7.0% by weight.

11. A method for preparing a soy milk based drink comprising a carbohydrate sweetening agent for masking a bitter, sour and/or astringent taste of the soy milk based drink, the method comprising:

providing an amount of carbohydrate sweetening agent that is insufficient to entirely mask the bitter, sour and/or astringent taste of the soy milk based drink; and adding a plant sterol ester in an amount that, in combination with the carbohydrate sweetening agent, is effective to mask the bitter, sour, and/or astringent taste of the soy milk based drink, wherein the amount of carbohydrate sweetening agent provided is 0.1-2.3% by weight, and wherein the amount of plant sterol ester added is 0.2-10% by weight.

12. A method for preparing a soy milk based drink comprising a non-carbohydrate sweetening agent for masking a bitter, sour and/or astringent taste of the soy milk based drink, the method comprising:

providing an amount of non-carbohydrate sweetening agent that is insufficient to entirely mask the bitter, sour and/or astringent taste of the soy milk based drink; and adding a plant sterol ester in an amount that, in combination with the non-carbohydrate sweetening agent, is effective to mask the bitter, sour, and/or astringent taste of the soy milk based drink, wherein the amount of non-carbohydrate sweetening agent provided is 0.00005 0.05% by weight, and wherein the amount of plant sterol ester added is 0.2-10% by weight.

13. A method for preparing a fruit and/or flavoured drink comprising soy and a carbohydrate sweetening agent for masking a bitter, sour and/or astringent taste of the fruit and/or flavoured drink, the method comprising:

providing an amount of carbohydrate sweetening agent that is insufficient to entirely mask the bitter, sour and/or astringent taste of the fruit and/or flavoured drink; and adding a plant sterol ester in an amount that, in combination with the carbohydrate sweetening agent, is effective to mask the bitter, sour, and/or astringent taste of the fruit and/or flavoured drink, wherein the amount of carbohydrate sweetening agent provided is 0.1-9.0% by weight, and wherein the amount of plant sterol ester added is 0.2-10% by weight.

14. A method for preparing a fruit and/or flavoured drink comprising soy and a non-carbohydrate sweetening agent for masking a bitter, sour and/or astringent taste of the fruit and/or flavoured drink, the method comprising:

providing an amount of non-carbohydrate sweetening agent that is insufficient to entirely mask the bitter, sour and/or astringent taste of the fruit and/or flavoured drink; and adding a plant sterol ester in an amount that, in combination with the non-carbohydrate sweetening agent, is effective to mask the bitter, sour, and/or astringent taste of the fruit and/or flavoured drink, wherein the amount of non-carbohydrate sweetening agent provided is 0.00005-0.05% by weight, and wherein the amount of plant sterol ester added is 0.2-10% by weight.

15. A method for preparing a coffee or cocoa drink comprising soy and a carbohydrate sweetening agent for masking a bitter, sour and/or astringent taste of the coffee or cocoa drink, the method comprising:

providing an amount of carbohydrate sweetening agent that is insufficient to entirely mask the bitter, sour and/or astringent taste of the coffee or cocoa drink; and adding a plant sterol ester in an amount that, in combination with the carbohydrate sweetening agent, is effective to mask the bitter, sour, and/or astringent taste of the coffee or cocoa drink, wherein the amount of carbohydrate sweetening agent provided is 0.1-5.5% by weight, and wherein the amount of plant sterol ester added is 0.2-10% by weight.

16. A method for preparing a coffee or cocoa drink comprising soy and a non-carbohydrate sweetening agent for masking a bitter, sour and/or astringent taste of the coffee or cocoa drink, the method comprising:

providing an amount of non-carbohydrate sweetening agent that is insufficient to entirely mask the bitter, sour and/or astringent taste of the coffee or cocoa drink; and adding a plant sterol ester in an amount that, in combination with the non-carbohydrate sweetening agent, is effective to mask the bitter, sour, and/or astringent taste of the coffee or cocoa drink, wherein the amount of non-carbohydrate sweetening agent provided is 0.00005-0.05% by weight, and wherein the amount of plant sterol ester added is 0.2-10% by weight.

17. A method for preparing a whey based drink comprising a carbohydrate sweetening agent for masking a bitter, sour and/or astringent taste of the cereal whey based drink, the method comprising:

providing an amount of carbohydrate sweetening agent that is insufficient to entirely mask the bitter, sour and/or astringent taste of the whey based drink; and adding a plant sterol ester in an amount that, in combination with the carbohydrate sweetening agent, is effective to mask the bitter, sour, and/or astringent taste of the whey based drink, wherein the amount of carbohydrate sweetening agent provided is 0.5-7.0% by weight, and wherein the amount of plant sterol ester added is 0.2-7.0% by weight.

18. A method for preparing a berry based drink comprising a carbohydrate sweetening agent for masking a bitter, sour and/or astringent taste of the berry based drink, the method comprising:

providing an amount of carbohydrate sweetening agent that is insufficient to entirely mask the bitter, sour and/or astringent taste of the berry based drink; and adding a plant sterol ester in an amount that, in combination with the carbohydrate sweetening agent, is effective to mask the bitter, sour, and/or astringent taste of the berry based drink, wherein the amount of carbohydrate sweetening agent provided is 0.5-19% by weight, and wherein the amount of plant sterol ester added is 0.2-5.0% by weight.

19. A method of preparing a fruit juice based drink comprising sucrose for masking a bitter, sour and/or astringent taste of the fruit juice based drink, the method comprising:

providing an amount of sucrose that is insufficient to entirely mask the bitter, sour and/or astringent taste of the fruit juice based drink; and adding a plant sterol ester in an amount that, in combination with the sucrose, is effective to mask the bitter, sour, and/or astringent taste of the fruit juice based drink, wherein the amount of sucrose provided is 0.1-7.5% by weight, and wherein the amount of plant sterol ester added is 0.2-5.0% by weight.

20. A method of preparing a fruit juice based drink comprising a citrus fruit juice and a carbohydrate sweetening agent for masking a bitter, sour and/or astringent taste of the fruit juice based drink, the method comprising:
   providing an amount of citrus fruit juice and carbohydrate sweetening agent that is insufficient to entirely mask the bitter, sour and/or astringent taste of the fruit juice based drink; and
   adding a plant sterol ester in an amount that, in combination with the citrus fruit juice and the carbohydrate sweetening agent, is effective to mask the bitter, sour, and/or astringent taste of the fruit juice based drink,
   wherein the amount of citrus fruit juice provided is at least 50% by weight calculated on the amount of total fruit juice in the product,
   wherein the amount of carbohydrate sweetening agent provided is 0.2-7.5% by weight, and
   wherein the amount of plant sterol ester added is 0.2-5.0% by weight.

21. A method for preparing a fruit juice based drink comprising a non-carbohydrate sweetening agent for masking a bitter, sour and/or astringent taste of the fruit juice based drink, the method comprising:
   providing an amount of non-carbohydrate sweetening agent that is insufficient to entirely mask the bitter, sour and/or astringent taste of the fruit juice based drink; and
   adding a plant sterol ester in an amount that, in combination with the non-carbohydrate sweetening agent, is effective to mask the bitter, sour, and/or astringent taste of the fruit juice based drink,
   wherein the amount of non-carbohydrate sweetening agent provided is 0.00005-0.05% by weight, and
   wherein the amount of plant sterol ester added is 0.2-5.0% by weight.

22. A method for preparing a fermented milk product comprising a carbohydrate sweetening agent for masking a bitter, sour and/or astringent taste of the fermented milk product, the method comprising:
   providing an amount of non-carbohydrate sweetening agent that is insufficient to entirely mask the bitter, sour and/or astringent taste of the fermented milk product; and
   adding a plant sterol ester in an amount that, in combination with the carbohydrate sweetening agent, is effective to mask the bitter, sour, and/or astringent taste of the fermented milk product,
   wherein the amount of carbohydrate sweetening agent provided is 0.5-6.0% by weight, and
   wherein the amount of plant sterol ester added is 0.2-8.0% by weight.

23. A method for preparing a fermented milk product comprising a non-carbohydrate sweetening agent for masking a bitter, sour and/or astringent taste of the fermented milk product, the method comprising:
   providing an amount of non-carbohydrate sweetening agent that is insufficient to entirely mask the bitter, sour and/or astringent taste of the fermented milk product; and
   adding a plant sterol ester in an amount that, in combination with the non-carbohydrate sweetening agent, is effective to mask the bitter, sour, and/or astringent taste of the fermented milk product,
   wherein the amount of non-carbohydrate sweetening agent provided is 0.00005-0.08% by weight, and
   wherein the amount of plant sterol ester added is 0.2-8.0% by weight.

24. A method for preparing a cereal-based yoghurt product comprising a carbohydrate sweetening agent for masking a bitter, sour and/or astringent taste of the cereal-based yoghurt product, the method comprising:
   providing an amount of carbohydrate sweetening agent that is insufficient to entirely mask the bitter, sour and/or astringent taste of the cereal-based yoghurt product; and
   adding a plant sterol ester in an amount that, in combination with the carbohydrate sweetening agent, is effective to mask the bitter, sour, and/or astringent taste of the cereal-based yoghurt product,
   wherein the amount of carbohydrate sweetening agent provided is 0.5-9.5% by weight, and
   wherein the amount of plant sterol ester added is 0.2-12% by weight.

25. A method for preparing a yoghurt product comprising soy and a carbohydrate sweetening agent for masking a bitter, sour and/or astringent taste of the yoghurt product, the method comprising:
   providing an amount of carbohydrate sweetening agent that is insufficient to entirely mask the bitter, sour and/or astringent taste of the yoghurt product; and
   adding a plant sterol ester in an amount that, in combination with the carbohydrate sweetening agent, is effective to mask the bitter, sour, and/or astringent taste of the yoghurt product,
   wherein the amount of carbohydrate sweetening agent provided is 0.5-9.0% by weight, and
   wherein the amount of plant sterol ester added is 0.2-12% by weight.

26. A method for preparing a yoghurt product comprising soy and a non-carbohydrate sweetening agent for masking a bitter, sour and/or astringent taste of the yoghurt product, the method comprising:
   providing an amount of carbohydrate sweetening agent that is insufficient to entirely mask the bitter, sour and/or astringent taste of the yoghurt product; and
   adding a plant sterol ester in an amount that, in combination with the non-carbohydrate sweetening agent, is effective to mask the bitter, sour, and/or astringent taste of the yoghurt product,
   wherein the amount of non-carbohydrate sweetening agent provided is 0.00005-0.08% by weight, and
   wherein the amount of plant sterol ester added is 0.2-12% by weight.

27. A method for preparing an ice cream product comprising a carbohydrate sweetening agent for masking a bitter, sour and/or astringent taste of the ice cream product, the method comprising:
   providing an amount of carbohydrate sweetening agent that is insufficient to entirely mask the bitter, sour and/or astringent taste of the ice cream product; and
   adding a plant sterol ester in an amount that, in combination with the carbohydrate sweetening agent, is effective to mask the bitter, sour, and/or astringent taste of the ice cream product,
   wherein the amount of carbohydrate sweetening agent provided is 0.5-7.0% by weight, and
   wherein the amount of plant sterol ester added is 0.2-18% by weight.

28. A method for preparing a liquid meal replacement product comprising a carbohydrate sweetening agent for masking a bitter, sour and/or astringent taste of the liquid meal replacement product, the method comprising:

providing an amount of carbohydrate sweetening agent that is insufficient to entirely mask the bitter, sour and/or astringent taste of the liquid meal replacement product; and adding a plant sterol ester in an amount that, in combination with the carbohydrate sweetening agent, is effective to mask the bitter, sour, and/or astringent taste of the liquid meal replacement product, wherein the amount of carbohydrate sweetening agent provided is 0.5-6.5% by weight, and wherein the amount of plant sterol ester added is 0.2-10% by weight.

29. A method for preparing a tea based drink comprising a carbohydrate sweetening agent for masking a bitter, sour and/or astringent taste of the tea based drink, the method comprising:

providing an amount of carbohydrate sweetening agent that is insufficient to entirely mask the bitter, sour and/or astringent taste of the tea based drink; and adding a plant sterol ester in an amount that, in combination with the carbohydrate sweetening agent, is effective to mask the bitter, sour, and/or astringent taste of the tea based drink, wherein the amount of carbohydrate sweetening agent provided is 0.5-17% by weight, and wherein the amount of plant sterol ester added is 0.2-5.0% by weight.

30. A method for masking a bitter, sour and/or astringent taste of an edible product comprising a sweetening agent for masking the bitter, sour, and/or astringent taste of the edible product, the method comprising:

providing an amount of sweetening agent that is insufficient to entirely mask the bitter, sour and/or astringent taste of the edible product; and adding a plant sterol ester in an amount that, in combination with the sweetening agent, is effective to mask the bitter, sour, and/or astringent taste of the edible product, wherein the amount of plant sterol ester added is from 0.2 to 25% by weight.

31. The method of claim 2, wherein the amount of plant sterol ester added is from 1 to 10% by weight.

* * * * *